US008489016B2

(12) United States Patent
Saadani et al.

(10) Patent No.: US 8,489,016 B2
(45) Date of Patent: Jul. 16, 2013

(54) METHOD FOR DATA COMMUNICATION IN A CO-OPERATIVE CELLULAR NETWORK, AND CORRESPONDING DEVICE AND COMPUTER PROGRAM PRODUCT

(75) Inventors: Ahmed Saadani, Issy les Moulineaux (FR); Michael Dohler, Barcelona (ES)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 12/677,992

(22) PCT Filed: Sep. 12, 2008

(86) PCT No.: PCT/FR2008/051629
§ 371 (c)(1),
(2), (4) Date: Apr. 21, 2010

(87) PCT Pub. No.: WO2009/047418
PCT Pub. Date: Apr. 16, 2009

(65) Prior Publication Data
US 2010/0216393 A1    Aug. 26, 2010

(30) Foreign Application Priority Data
Sep. 14, 2007   (FR) ...................................... 07 57614

(51) Int. Cl.
*H04B 3/36* (2006.01)
(52) U.S. Cl.
USPC ......... 455/7; 455/8; 455/9; 455/10; 455/11.1; 455/12.1; 709/227; 709/228; 709/229; 709/244
(58) Field of Classification Search
USPC ................. 455/7–25; 709/227–229, 238–244
See application file for complete search history.

(56) References Cited

U.S. PATENT DOCUMENTS

2007/0189260 A1    8/2007  Chang
2009/0036114 A1*   2/2009  Mohebbi ..................... 455/422.1

OTHER PUBLICATIONS

English Translation of the Written Opinion for corresponding International Application No. PCT/FR2008/051629, filed Sep. 12, 2008.
International Search Report for corresponding International Application No. PCT/FR2008/051629, filed Sep. 12, 2008.
Written Opinion for corresponding International Application No. PCT/FR2008/051629, filed Sep. 12, 2008.
Ralf Kattenbach: "Statistical Modeling of Small-Scale Fading in Directional Radio Channels" IEEE Journal on Selected Areas in Communications, IEEE Service Center, Piscataway, US, vol. 20., No. 3, avril 2002 (Apr. 2002).
C.S. Patel et al. in the document "Statistic Properties of Amplify and Forward Relay Fading Channels" (IEEE Transactions on Vehicular technology, vol. 55, No. 1, Jan. 2006.
"W.C. Jakes, Microwave Mobile Communications. New York: IEEE Press, 1974".

* cited by examiner

*Primary Examiner* — Fayyaz Alam
(74) *Attorney, Agent, or Firm* — David D. Bush; Westman, Champlin & Kelly, P.C.

(57) ABSTRACT

A method is provided for communication between at least one source entity and one destination entity, in a cooperative network that includes a plurality of entities. The method includes a step of determining, for a given entity of the network, a temporal variation of an impulse response of a transmission channel established between the given entity and another entity. The method further includes: a step of determining a temporal variation of an impulse response of at least one global transmission channel intended to be established between the source entity and the destination entity and passing through at least one relay entity, on the basis of the temporal variations of the impulse responses of the transmission channels; and a step of selecting a global transmission channel from among the set of global transmission channels determined.

7 Claims, 4 Drawing Sheets

| M1 | M2 | M2 | M2 | M3 | M3 | M3 | M2 | M2 | M2 | M3 | M3 | M3 | M3 | M1 | M2 |

| M2 | M3 | M3 | M3 | M1/M4 | M2 | M1/M4 | M3 | M3 | M3 | M3 | M1/M4 | M1/M4 | M2 |

METHOD FOR DATA COMMUNICATION IN A CO-OPERATIVE CELLULAR NETWORK, AND CORRESPONDING DEVICE AND COMPUTER PROGRAM PRODUCT

CROSS-REFERENCE TO RELATED APPLICATIONS

This Application is a Section 371 National Stage Application of International Application No. PCT/FR2008/051629, filed Sep. 12, 2008 and published as WO on Apr. 16, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of radio transmission systems using mobile entities. More precisely, the disclosure lies in the context of cooperative cellular networks, allowing cooperation between entities present in cells of the network.

Within such a network, an entity can be a fixed or mobile terminal, a relay node or a base station. An entity which helps a source entity to route a message toward a destination entity is called a relay (or relay entity). A strategy of cooperation at the level of such relay entities consists for example in amplifying a signal received from a source entity or by another relay entity and then in retransmitting it to another relay entity or destination entity.

Conventionally, within such systems, a selection of source entities authorized to transmit information is carried out. This selection of the source entities authorized to transmit is ensured by a scheduler. Thus, within a given cell, the source entity or entities for which the respective transmission channel with the destination entity is among the best is or are selected by priority, and then these source entities are authorized to transmit information to the destination entity. This may involve for example the least disturbed channels. A gain in rate in the cell is thus obtained. This gain is called multiuser diversity gain and is obtained by the application of a scheduling policy by the scheduler.

An exemplary expect of the invention lies in a context of optimizing the cooperation between the various entities of a system, for example when a transmission channel established between two entities of the system exhibits poor radio conditions.

Such a radio communication system with cooperation therefore takes the form of a set of entities comprising at least one source entity, at least one relay entity and at least one destination entity. The source entity transmits information to the destination entity or to the relay entity, which itself retransmits this information to the destination entity or to another relay entity. The cooperation is ensured by allowing a relay entity to relay the information from a source entity to a destination entity.

The cooperation between the various entities of the system allows in particular a gain in diversity of the transmission channel between the source entity and the destination entity, an increase in the capacity of the system, or else a reduction in the consumption of transmission power of the source.

BACKGROUND OF THE DISCLOSURE

Several techniques for cooperation between the entities of the system are known from the prior art. They depend on several parameters. These techniques depend, in particular, on the access technique used within the system. Thus:

- by using a TDMA access technique (standing for "Time division multiple access"), the cooperation between a sender and a relay is effected in two steps. The first of these two steps is a phase during which the relay (and optionally the receiver) listens to the sender. The second step is a phase during which the relay processes the information that it has listened to and retransmits it to the receiver;
- by using an FDMA access technique (standing for "Frequency Division Multiple Access"), cooperation is achieved by using two different frequency bands. The sender sends the information on a frequency band which is received by the relay (and optionally the receiver). The relay processes the information using a relay strategy and retransmits it using another frequency band. The receiver thus receives the information with a temporal shift on another frequency band;
- by using an OFDMA technique (standing for "Orthogonal Frequency Division Multiple Access"), one and the same methodology as the FDMA case can be applied with the difference that the original signal of the source entity and that of the relay entity are transmitted on two different sub-carriers;
- by using a CDMA technique (standing for "Code Division Multiple Access"), cooperation is achieved by using two spreading codes C1 and C2. The sender sends the information using the code C1. The relay processes the information and retransmits it using the code C2. The receiver thus receives the information from the relay with a temporal shift.

Cooperation can also be used when other access techniques are implemented.

Cooperation techniques also use several relay strategies, as a function of the abovementioned access techniques implemented. Among these relay strategies may be cited:

- amplification and then retransmission: the relay entity amplifies the signal received from the source entity and retransmits it to the destination entity;
- decoding and then retransmission: the relay entity decodes the information from the source entity, it encodes it and then retransmits it to the destination entity;
- quantization and compression followed by retransmission: the relay entity compresses the signal received from the source entity and then retransmits it to the destination entity;
- hybrid schemes combining the above schemes.

When the transmission channel established between one or more source entities and a destination entity exhibits poor radio conditions, the source entities may wait a lengthy period before being authorized to transmit by the scheduler. Moreover, when opportunistic scheduling is used (scheduling which favors the sources having the best radio conditions), those source entities for which the transmission channels established with the destination entity exhibit the worst radio conditions are rarely authorized to transmit.

Certain so-called real-time services impose a limit waiting time of the source entity before it is authorized to transmit not to be exceeded. This aspect has been solved in the prior art by way of an authorized maximum probability that the mean waiting time of a source entity exceeds a fixed threshold.

Prior art cooperation techniques have attempted to propose criteria for selecting the relays allowing a source entity to be chosen by a scheduler more frequently than it is without these techniques, in a mobile radio system supporting cooperation between its various entities (that is to say the various entities present in one of the cells of the cellular network).

This assumes the existence of signaling allowing the choosing of the relays allocated to a given source for a given destination as well as the start and end times of the phases of the cooperation when it is used. It is assumed that the transmission channels which link the source entity and the destination entity, and also the relay entities, are known by the scheduler.

When the radio conditions are bad, that is to say, when the transmission channel established between the source entity and a destination entity exhibits an attenuation such that the transmission of real-time services cannot be ensured, a source entity will wait for a long time before being selected by the scheduler, within the framework of opportunistic scheduling. In order to reduce this waiting lag, several prior art techniques exist:

priority allocation to the source entity and priority management at the level of the scheduler. The priority of the source entity is increased as a function of the waiting time. In this solution, the transmission channel established between the source entity and the destination entity remains unchanged.

compulsory transit through one or more fixed relay entities. Such a scheme consists in searching for a new route consisting of one or more fixed relay entities making it possible to improve the radio quality. This scheme has in particular been proposed for non-real-time services and for an uplink, that is to say a link from the source entity to a fixed destination entity such as a base station, modification of the phase of the signal at the level of a relay entity. A signal is sent by the source entity destined for two distinct relay entities, each of these relay entities multiplying the signal received by a random phase. The combining on reception of the signals originating from each of the relay entities will give a time-varying global attenuation.

Unfortunately, these earlier techniques exhibit a certain number of drawbacks.

Thus, when considering the technique of priority allocation to a source entity without changing the current transmission channel established with the destination entity, it is noted that this technique requires a change at the scheduler level. Moreover, such a technique does not guarantee sufficient transmission channel quality to be able to transmit. Finally, there is a risk that this priority allocation technique may considerably reduce multi-user diversity gain when opportunistic scheduling is used.

The technique of compulsory transit through one or more fixed relay entities requires for its part the existence of fixed relay entities in the cell. It therefore cannot be implemented in all typical cases.

Finally, the technique of modifying the phase of the signal at the level of a relay entity requires the presence of at least two relay entities. It is therefore expensive in terms of resources.

SUMMARY

Thus, there exists a requirement for a scheme making it possible to reduce the waiting lag of a source entity.

To this end, an embodiment of the invention proposes a method of communication between at least one source entity and one destination entity, in a cooperative network comprising a plurality of entities, the method comprising a step of determining, for a given entity of said network, a temporal variation of an impulse response of a transmission channel established between said given entity and another entity.

Such a method is particular in that it comprises:

a step of determining a temporal variation of an impulse response of at least one global transmission channel intended to be established between the source entity and the destination entity and passing through at least one relay entity, on the basis of the temporal variations of the impulse responses of said transmission channels;

a step of selecting a global transmission channel from among the set of global transmission channels determined.

This technique consists in utilizing the information regarding the temporal variation in the impulse responses of transmission channels established between two entities of a cell of a cellular network to determine a global transmission channel consisting of a set of these transmission channels.

The method which is the subject of an embodiment of the invention therefore makes it possible, by selecting a global transmission channel to be established between the source entity, the relay entity and the destination entity, to authorize the source entity to transmit more frequently despite the fact that the transmission channel established directly between the source entity and the destination entity exhibits an attenuation such that the transmission of real-time services may not be ensured.

Stated otherwise, the combination of the characteristics of the transmission channel established between the source entity and the relay entity and of the characteristics of the transmission channel established between the relay entity and the destination entity makes it possible to determine a global transmission channel exhibiting a lesser attenuation than that of the transmission channel established directly between the source entity and the destination entity. This implies reducing the waiting lag of the source entity before being authorized to send.

Thus, the information regarding temporal variation that is considered is not information regarding partial temporal variation relating to a transmission channel established for example between a source entity and a relay entity or between the relay entity and a destination entity, but information regarding global variation relating to a global transmission channel to be established between a source entity and a destination entity and passing via at least one relay entity. Global variation information such as this makes it possible to select from among several determined global transmission channels, the one which will be the most suitable, as opposed to selecting according to just a partial temporal variation which provides no clue as to the state of the temporal variation of the impulse response of the global transmission channel to be established between the source entity and the destination entity and passing via at least one relay entity.

According to a particular characteristic of an embodiment of the invention, the temporal variation of an impulse response of at least one transmission channel is determined on the basis of a mean value of the impulse responses of said transmission channels and of a speed of travel of said given entity.

Such a solution requires lesser complexity of calculations, the scheduler not having to determine a value of the temporal variation of the impulse response of all the transmission channels established between the various entities of the cooperative network.

According to a particular characteristic of an embodiment of the invention, a global transmission channel is selected when the temporal variation of the impulse response of said global transmission channel is above a predetermined threshold and when a temporal variation of an impulse response of a transmission channel established directly between the source entity and the relay entity is below said predetermined threshold.

Thus, a temporal variation threshold below which it is useless to select this global transmission channel is determined in advance. This threshold can be configured in a static manner or be variable over time or in space, for example as a function of the structural conditions of location of the antennas or of the nature of the terrain where the cell of the cellular network is implanted.

According to a particular characteristic of an embodiment of the invention, said selection step takes account of at least one additional criterion belonging to the group comprising:
   an attenuation of a signal in said transmission channel;
   a speed of travel of said relay entity;
   a distance between said source entity and said relay entity;
   a distance between said relay entity and said destination entity;
   a quantity of passband available;
   an operating state of said relay entity;
   interference (between various paths, between users, between cells).

According to a feature of the method which is the subject of an embodiment of the invention, the method comprises a step of informing the relay entity $M_k$ through which the selected global channel passes to relay exchanges of data between the source entity $M_i$ and the destination entity $M_j$.

An embodiment of the invention also relates to a device for managing a communication between at least one source entity and one destination entity, in a cooperative network comprising a plurality of entities, the device comprising means for determining, for a given entity of said network, a temporal variation of an impulse response of a transmission channel established between said given entity and another entity for managing data transmission from a source entity to a destination entity, said first and second entities belonging to at least one cell of a cooperative cellular network comprising a plurality of entities, the device comprising means for determining, for each entity belonging to said cell, a temporal variation of an impulse response of a transmission channel established between a first entity and a second entity.

Such a device is particular in that it comprises:
   means for determining a temporal variation of an impulse response of at least one global transmission channel intended to be established between the source entity and the destination entity and passing through at least one relay entity, on the basis of the temporal variations of the impulse responses of said transmission channels;
   means for selecting a global transmission channel from among the set of global transmission channels determined.

According to a feature of the device for managing data transmission which is the subject of an embodiment of the invention said device also comprises means for informing the relay entity through which the selected global channel passes to relay exchanges of data between the source entity and the destination entity.

According to another aspect, an embodiment of the invention also relates to a computer program product downloadable from a communication network and/or stored on a medium readable by computer and/or executable by a microprocessor, and comprising program code instructions for the execution of the communication method such as described above.

BRIEF DESCRIPTION OF THE DRAWINGS

Other characteristics and advantages will be more clearly apparent on reading the following description of an embodiment of the invention, given by way of simple illustrative and nonlimiting example, and the appended drawings, among which.

DETAILED DESCRIPTION OF ILLUSTRATIVE EMBODIMENTS

Figure 1:
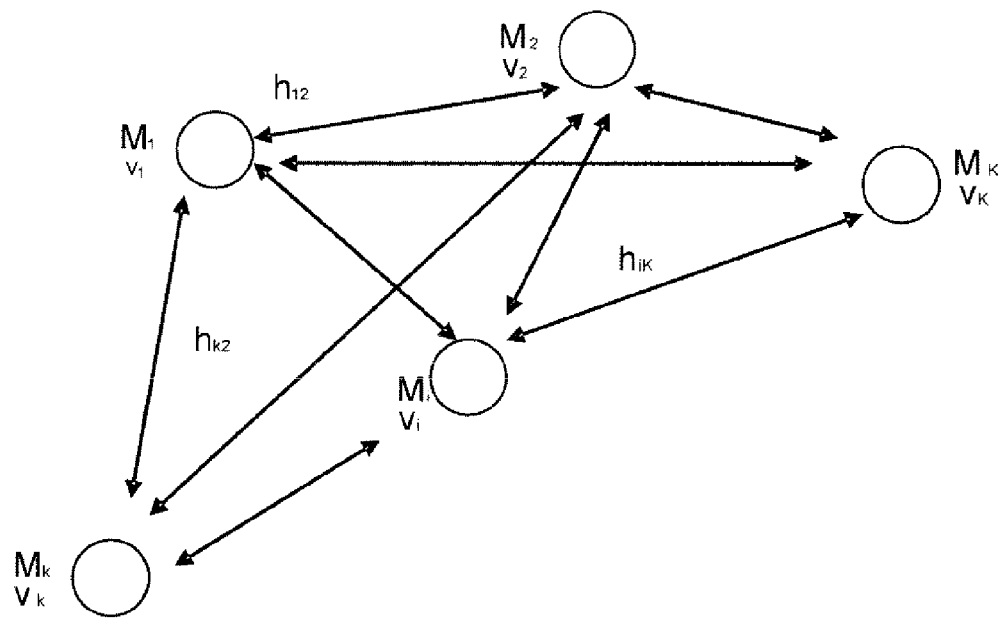
FIG. 1 is a chart illustrating a cellular network, cell comprising K entities able to cooperate amongst themselves.

1. Reminder of the Principle of an Embodiment of the Invention

An exemplary embodiment of the invention proposes a novel technique for selecting global transmission channels established between a source entity and a destination entity and passing through one or more relay entities, making it possible to relay data from the source entity to the destination entity, thereby making it possible to reduce the waiting lag of a source entity for it to be authorized to transmit.

Such a reduction in lag can for example turn out to be useful when the transmission channel established between a source entity and a destination entity is disturbed, causing a low frequency of selection of the source entity, in particular when an opportunistic scheduling is implemented.

The general principle of an embodiment of the invention relies on the selecting of a global transmission channel established between a source entity and a destination entity and passing through at least one relay entity to retransmit information received from the source entity to the destination entity. Thus, consequently:
   the transmission waiting lag of the source entity (or entities), that is to say the lag until the source entity is selected and authorized by the scheduler to transmit information, is reduced;

certain constraints of the system, such as for example the transmission rate, the probability of cutoff, etc., are complied with.

The reduction in this lag in selecting the source entity is obtained through the implementation of the method for communicating data between a source entity and a destination entity, via at least one relay entity, according to an embodiment of the invention. The relay entity is a mobile entity, that is to say traveling within the cell, which may for example use a relay strategy relying on amplification and retransmission such as described previously.

An embodiment of the invention therefore proposes to utilize the temporal variation properties of the impulse response of the transmission channels established between two entities of the cell to select a global transmission channel linking the source entity to the destination entity and passing through at least one mobile relay entity, and thus reduce the lag in selecting the source entity.

A cooperative network is for example considered, in which it is assumed that characteristics of a transmission channel established between the source entity and the destination entity evolve little over time and that these characteristics exhibit values such that the data reception quality is not satisfactory. Such characteristics are for example the attenuation.

The consequence of this is that the waiting lag for a source entity to be authorized to send is long.

It is also assumed that there exists an entity playing the role of relay which travels within the cell implying a fast variation of the transmission channel linking it to the source entity, and of the transmission channel linking it to the destination entity.

This new transmission channel corresponding to the transmission channel intended to be established between the source entity and the destination entity by way of one or more relay entities, is called the global transmission channel.

Thus any information sent by the source entity is transmitted to the destination entity through the global transmission channel. The communication method according to an embodiment of the invention therefore makes it possible to establish a global transmission channel between the source entity and the destination entity to deputize for the transmission channel established directly between the source and the destination, the impulse response of the global transmission channel varying more rapidly over time than the impulse response of the direct transmission channel.

A network within which the communication method according to an embodiment of the invention can be applied is described in relation to FIG. 1. This network comprises K entities which can cooperate amongst themselves. These entities are called $M_1, M_2, \ldots, M_K$, each of them traveling at a speed $v_k$, for $k=1 \ldots K$, where $v_k$ can be equal to 0. Each transmission channel linking an entity i ($i=1 \ldots K$) to an entity j ($j=1 \ldots K$ and $i \neq j$) is denoted $h_{ij}$.

It is assumed that the temporal variations of the impulse response of the transmission channels linking these various entities together are known to a scheduler, which carries out for example an estimation of this variation for all these transmission channels, for example by using the pilot symbols scheme, known to the person skilled in the art. This scheduler is integrated into a network entity such as for example a base station.

When a source entity (for example $M_i$) desires to transmit information to a destination entity (for example $M_j$), it must be so authorized by the scheduler. If the transmission channel linking it directly to the destination entity does not exhibit a sufficient temporal variation of the impulse response of the channel, and if the speed of travel of the source entity is slow, this source entity may remain silent for a long period before being authorized to transmit.

Knowing the temporal variation properties of the impulse response of the other transmission channels (for example the transmission channels $h_{ik}$ and $h_{kj}$), the scheduler offers the source entity $M_i$ which wishes to transmit, a global transmission channel passing through one or more relays (for example $M_k$) in such a way that this new global transmission channel (that is to say the global transmission channel established between the source and the destination, and passing through the relay or relays) has a sufficient temporal variability of the impulse response of this channel to ensure the desired service. Stated otherwise, the global transmission channel intended to be established between the source entity and the destination entity by way of the relay entities exhibits an impulse response that varies more rapidly than that of the transmission channel established directly between the source entity $M_i$ and the destination entity $M_j$.

The variation of the impulse response of the transmission channels is for example evaluated by means of a channel temporal correlation function $R(\tau)$, which characterizes the speed of variation of a channel established between the entities i and j. This function $R(\tau)$ is defined as the statistical mean of the product of the impulse response $h_{ij}$ of the channel at the instant t and of its conjugate, denoted $h^*_{ij}$, at the instant $t+\tau$:

$$R(\tau)=E(h_{ij}(t)h^*_{ij}(t+\tau))$$

Thus, the greater the decay of this correlation function, the more significant the temporal variability of the impulse response of the channel, that is to say the variations of the attenuation of a signal transmitted through the channel over time.

The communication method according to an embodiment of the invention, for example implemented within a scheduler, can be based on such a metric of temporal correlation function type to identify one or more global transmission channels, intended to be established between a source entity and a destination entity and passing through one or more relay entities, that may transmit the information between the given source entity and the given destination entity.

In an embodiment of the method, the property of the autocorrelation of the attenuation of the transmission channel can be considered as metric for choosing a global transmission channel, it then suggests to the source entity $M_i$ to establish a global transmission channel passing through a relay entity $M_k$ ($k=1 \ldots K$ and $k \neq i \neq j$) so as to reach $M_j$ such that the autocorrelation function:

$$R'(\tau)=E(h_{ik}(t)h_{kj}(t)h^*_{ik}(t+\tau)h^*_{kj}(t+\tau))$$

decays sufficiently to ensure the desired service. This decay reflects the speed of temporal variability of the impulse response of the global transmission channel and therefore the waiting time of a source entity before being able to be authorized to send when the direct transmission channel established between this source entity and a destination entity is beset by poor radio conditions.

This decay is strongly linked with the speed $v_k$ of travel of the relay entity $M_k$. Thus, in another embodiment of the communication method, the variation of the impulse response of the transmission channels is evaluated on the basis of a mean value of the impulse response of a transmission channel and of a value of the speed of travel of one of the entities between which the transmission channel is established. Thus, the greater the speed of travel of one of the entities between which the transmission channel is established, the larger the temporal variation of the impulse response.

The calculation of the function R'(τ) is in particular described by C. S. Patel et al. in the document "*Statistic properties of amplify and forward relay fading channels*" (IEEE Transactions on Vehicular technology, Vol. 55, No. 1, January 2006), in the case of a single relay entity, for a transmission channel of Rayleigh type between the source entity and the relay entity and between the relay entity and the destination entity. This is an assumption made about the nature of the transmission channel in a particular embodiment of the invention.

Of course other metrics, for example metrics of order 2, could be used. An exemplary illustration of such a metric is the following:

$$R''(\tau)=E(|h_{ik}(t)|^2|h_{kj}(t)|^2|h_{ik}(t+\tau)|^2|h_{kj}(t+\tau)|^2)$$

Thus the temporal variability of the impulse response of the global transmission channel established between the source entity and the destination entity is significant enough to ensure communication between the source entity and the destination entity. The relative speeds of travel of the relay entity or entities amongst themselves and in relation to the source entity and/or the destination entity are therefore used to determine the temporal variability of the impulse response of the transmission channels established between the source entity and the relay entity or entities and between this relay entity and the destination entity and to select the global transmission channel established between the source entity and the destination entity.

Figure 2:
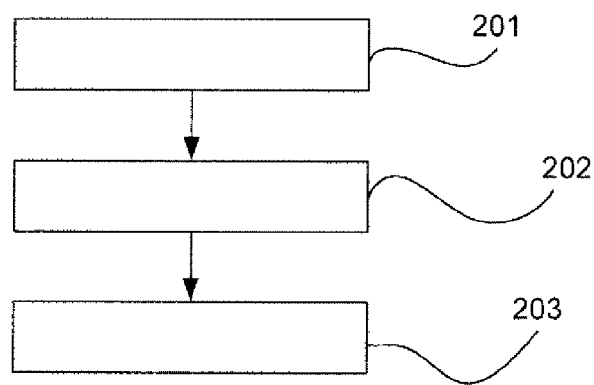
FIG. 2 illustrates the various steps of implementing the communication method according to an embodiment of the invention.

Thus the communication method according to an embodiment of the invention comprises the following steps, illustrated in relation to FIG. 2:
- a step 201 of determining an information regarding the temporal variation of the impulse response of global transmission channels intended to be established between a source entity and a destination entity and passing through at least one relay entity, with the help of information regarding the temporal variation of the impulse response of transmission channels established between the various entities traveling within the cell of the cellular network, for example the entities $M_1$, $M_2, \ldots, M_k$;
- a step 202 of selecting, from among the set of possible global transmission channels, a global transmission channel as a function of the information regarding the temporal variation of the impulse response of the set of global transmission channels that are intended to be established between the source entity and the destination entity;
- a step 203 of informing the relay entity $M_k$ through which the selected global channel passes to relay exchanges of data between the source entity $M_i$ and the destination entity $M_j$.

Such selection of a global transmission channel as a function of the temporal variability of the impulse response of the global transmission channel makes it possible to reduce the waiting lag of a source entity before the latter is authorized to send by the scheduler.

Moreover, a global transmission channel such as this can pass through a relay entity belonging to a neighboring cell and situated within range of the scheduler. Thus, the role of relay entity is not limited solely to the mobile terminals of the cell.

2. Description of an Embodiment

Presented in this embodiment, again in relation to FIG. 1, is the implementation of the communication method within a cellular network comprising, in one and the same cell, a base station corresponding to the destination entity $M_j$, and K−1 mobile terminals $M_k$, for k=1 . . . K and k≠j, which can cooperate amongst themselves. It is also considered that:
- the access technique used within the system is the TDMA technique described above;
- that the mobile terminal $M_1$ (source entity) seeks to transmit data to the base station $M_j$, the link established between these two entities is an uplink: from the mobile terminal to the base station.

The base station is considered to be situated at a point high up with respect to the source entity and fixed in the cell (that is to say non-mobile). Consequently, it has no impact on the temporal variability of the impulse response of the radio channel established with the source entity.

It is assumed that the mobile terminal $M_1$ is placed in a partitioned environment, that is to say it is situated within a building for example, and thus sees the impulse response of the transmission channel linking it to the base station vary very slowly since the attenuation between the base station $M_j$ and the mobile terminal $M_1$ is significant, for example because of the distance, of the walls etc. Thus the attenuation of the transmission channel established between the terminals $M_1$ and $M_j$ is below a certain predetermined threshold which would allow them to communicate with one another. This threshold is in particular dependent on the application requested.

Moreover, the very slow variation over time of the impulse response of the transmission channel established between the terminals $M_1$ and $M_j$ may keep the mobile terminal $M_1$ under poor radio conditions for communicating with the base station $M_j$ for a significant duration, and this may be unacceptable for the mobile terminal $M_1$ according to the application requested.

The implementation of the method according to this embodiment leads the base station $M_j$ to request the mobile terminals present in its cell and able to cooperate with the mobile terminal $M_1$ to upload information to it relating to the temporal variability of the impulse response of the transmission channels established between each mobile terminal and the base station, between each mobile terminal and the source entity $M_1$ and between the various mutually mobile terminals. It should be noted that these mobile terminals are not necessarily active, that is to say they may only be in standby mode.

The base station $M_j$ then selects at least one global transmission channel linking it to the source entity and passing through a mobile terminal $M_k$ serving as relay entity. Once the global transmission channel has been selected, the base station requests the relay entity to relay the data transmitted by the mobile terminal $M_1$. The global transmission channel established between the source entity $M_1$ and the base station and passing through the relay entity $M_k$ is a transmission channel which exhibits a strong variation in its temporal properties.

If this global transmission channel does not satisfy certain conditions, different from the temporal variability of the impulse response, such as for example if this global transmission channel is more sensitive to interference, the base station evaluates another candidate to relay $M_1$. This procedure can be repeated until the base station finds an appropriate relay entity. Other conditions different from the temporal variability of the impulse response of the channel are for example: an attenuation of a signal in said transmission channel, a speed of travel of said relay entity, a distance between said source entity and said relay entity, a distance between said relay entity and said destination entity, a quantity of passband available, an operating state of said relay entity, interference (between various paths, between users, between cells).

According to his example, the base station is also considered to play the role of scheduler.

Thus, the base station regularly updates the values of the impulse responses $h_{ij}$, instantaneous or mean, of the transmission channels established between the various mobile terminals of the cell, and also their sensitivity to interference, for example, so as to permanently select, from among the possible global transmission channels, at least one which is able to relay the information transmission between the source entity $M_1$ and the destination entity $M_j$.

The method according to an embodiment of the invention therefore allows dynamic utilization of the temporal variability of the impulse response of the transmission channels established between the various mobile terminals of the cell so as to allow the mobile terminals whose transmission channel linking them to the base station exhibits weak temporal variability of impulse response or significant attenuation to profit from the greater variability of the temporal properties of transmission channels linking them to other mobile terminals which lie within their ranges.

3. Implementation Example

A base station and four mobile terminals (K=5) for a data transmission on an uplink (mobile terminal to base station) are considered in this example. It is also assumed that:
- three of the mobile terminals are traveling at one and the same speed equal to $v_0$;
- the fourth mobile terminal is traveling at a speed $10v_0$;
- the base station is immobile;
- the transmission channels established between the various terminals are of Rayleigh type and the variation model for the temporal variation of the impulse response of the transmission channels is that of Jakes (as described in the publication "W. C. Jakes, Microwave Mobile Communications. New York: IEEE Press, 1974");
- at a given instant, the base station allows only the mobile terminal which exhibits the best transmission channel quality to transmit, hence the case of an opportunistic scheduling is considered;
- a designated relay entity retransmits the signal that it has received after having amplified it, according to the amplification/retransmission strategy defined previously.

A criterion is also used to characterize the real-time service constraint. More precisely, this criterion is defined by the probability that the mean waiting time D of a source entity seeking to send exceeds a maximum lag $D_{max}$ which is below a fixed threshold $\epsilon$. This is equivalent to:

$$Pr(D>D_{max})<\epsilon$$

This criterion makes it possible to measure the mean waiting time of a source entity (for example a mobile terminal) before the latter is authorized to send.

This criterion is evaluated within the framework of two possible scenarios:
- Scenario 1: the three mobile terminals denoted $M_1$, $M_2$, $M_3$ are linked directly to the base station, without implementation of the method according to an embodiment of the invention;
- Scenario 2: the base station, knowing the mean value of the impulse response of the transmission channels established between the mobile terminal $M_1$ and the mobile terminal $M_4$ on the one hand and the mobile terminal $M_4$ and the base station on the other hand, requests the mobile terminal $M_4$ to upload to it an information about the value of its speed of travel. It decides to order it to relay the mobile terminal $M_1$.

Figures 3, 4, 5:
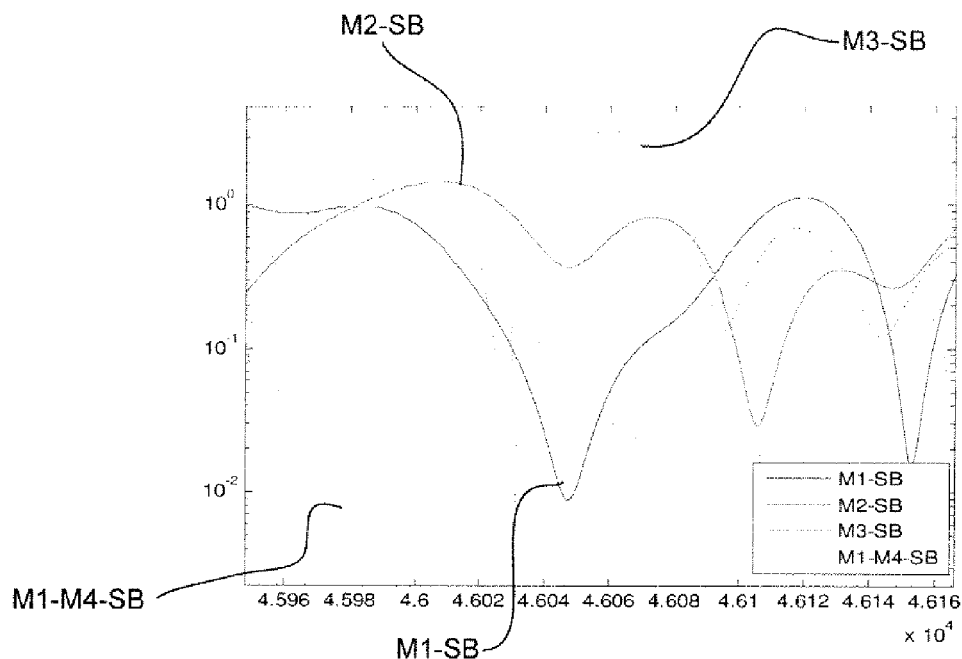
FIG. 3 represents temporal variations of the attenuations of the transmission channels established between three mobile entities $M_1$, $M_2$, $M_3$ and a base station SB as well as temporal variations of the attenuations of the global transmission channel established between the entity $M_1$ and the base station SB and relayed by an entity $M_4$.
FIG. 4 describes an exemplary selection of the mobile entities $M_1$, $M_2$ and $M_3$ for the TDMA access mode without implementing the communication method according to an embodiment of the invention.
FIG. 5 describes an exemplary selection of the mobile entities $M_1$, $M_2$ and $M_3$ for the TDMA access mode when implementing the communication method according to an embodiment of the invention.

Presented firstly in FIG. 3 are the temporal variations of the impulse response of the transmission channels established between the mobile terminal $M_1$ and the base station (transmission channel M1-SB), between the mobile terminal $M_2$ and the base station (transmission channel $M_2$-SB), between the mobile terminal $M_3$ and the base station (transmission channel $M_3$-SB), and of the global transmission channel established between the mobile terminal $M_1$, the mobile terminal $M_4$, and the base station (global transmission channel $M_1$-$M_4$-SB), and the gains imparted by an embodiment of the invention for these two scenarios.

More precisely, FIG. 3 presents as abscissa the time and as ordinate the attenuation of a transmission channel as a function of time.

FIG. 4 illustrates the allocation by a scheduler, over a time window, of time intervals to the source entities $M_1$, $M_2$, $M_3$ in the course of which they are authorized to send data, according to scenario 1 (prior art). FIG. 5 illustrates the allocation by a scheduler, over a time window, of time intervals to the source entities $M_1$, $M_2$, $M_3$, $M_4$, in the course of which the source entities $M_1$, $M_2$, $M_3$ are authorized to send, according to scenario 2 (an embodiment of the invention).

It is noted that without cooperation between the various mobile terminals of one and the same cell, the mobile terminal $M_1$ is selected solely at the start and at the end of the time window (FIG. 4). This low selection frequency results from the weak temporal variation of the impulse response of the transmission channel linking it directly to the base station. On the other hand, when a cooperation technique according to an embodiment of the invention is used, that is to say when the mobile terminal $M_4$ relays the transmissions of the mobile terminal $M_1$ via the global transmission channel M1-M4-SB, the latter is selected more frequently thereby reducing its waiting lag.

Figure 6:
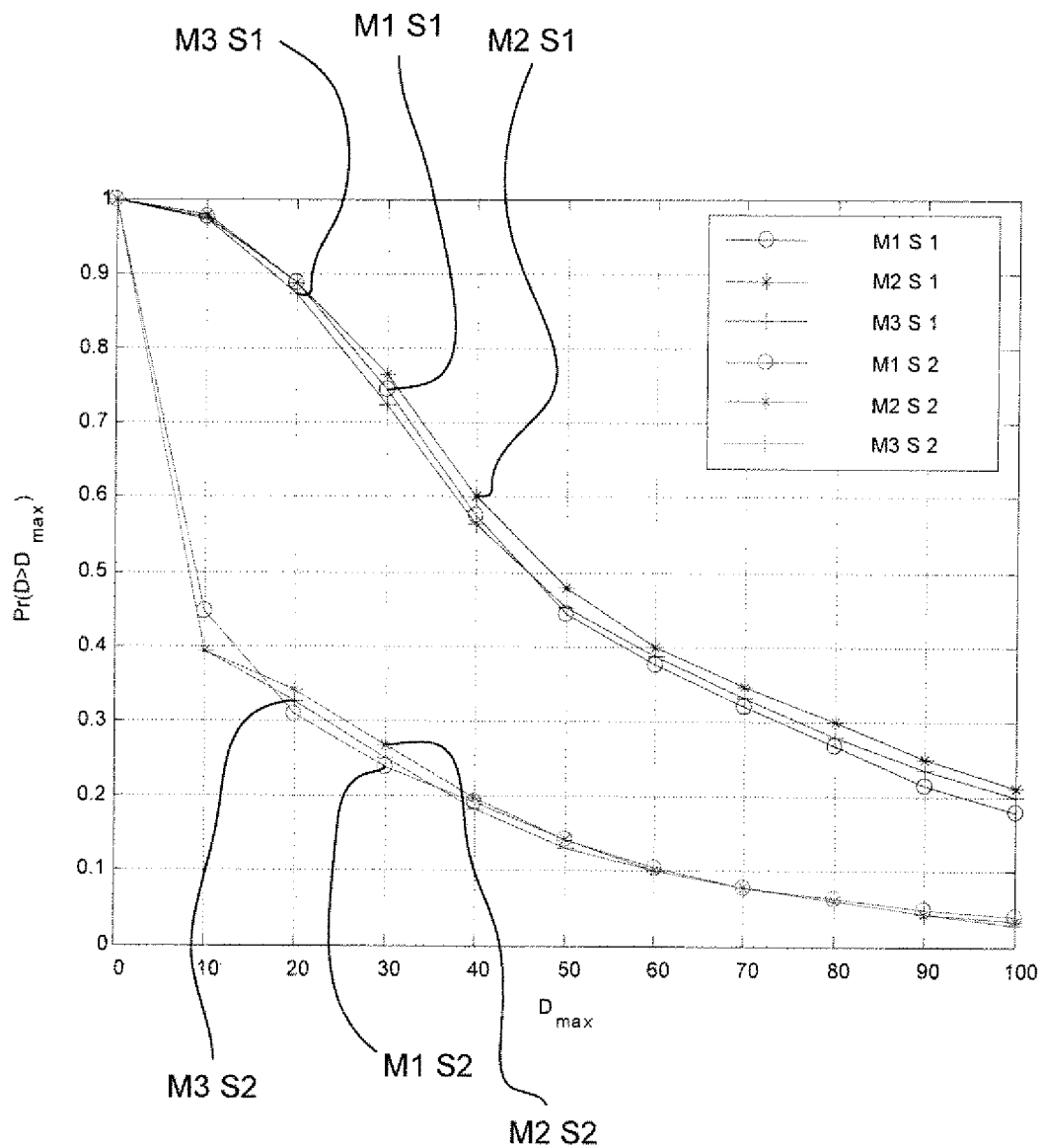
FIG. 6 illustrates the probabilities that the waiting lag of the mobile entities $M_1$, $M_2$ and $M_3$ exceeds a maximum lag, with and without implementation of the communication method according to an embodiment of the invention.

Finally, presented in FIG. 6 is the probability that the waiting time of a mobile terminal exceeds a maximum lag $D_{max}$, according to scenario 1 (S1) or scenario 2 (S2).

If for example a real-time service demands that this probability does not exceed 10% for a lag of 60 time units, this service will not be ensured in the first scenario for the three mobile terminals $M_1$, $M_2$, $M_3$. Indeed in this typical case, this probability equals 40%. However by using a sufficiently fast relay, such as within the framework of scenario 2, this probability is reduced to 10%.

Stated otherwise, without selecting a relay mobile terminal as in the case of the first scenario, the probability that the constraint imposed by the real-time service for a lag of 60 temporal units is not complied with is 40%.

By using a relay mobile terminal as in the case of scenario 2, this probability is then only 10%. The imposed constraints are therefore complied with more often by virtue of an embodiment of the invention.

An embodiment of the invention can also be implemented in other types of network such as for example networks of "Broadcast" type. A transmission channel is said to be a "Broadcast" transmission channel when a source entity transmits to several destination entities a set of information which may be common to all the destinations. An example of this type of network is telebroadcasting. In such a network, an embodiment of the invention is, for example, implemented so that a base station can broadcast information to a set of mobile terminals, some of the terminals of the set being used to relay the information to other terminals which are not accessible directly by the base station.

An embodiment of the invention can also be implemented in the case of a network using an access technique termed "Multiple Access" which is, as has already been described above, a network in which several source entities transmit information packets to one and the same destination. A typical example is an uplink for a cellular system where all the mobile terminals transmit information to the base station.

An embodiment of the invention can also be implemented within the framework of an "ad hoc network", which is a network which is able to organize itself without an infrastructure having been defined beforehand. In this type of network, each entity can play various roles: source, destination, relay etc. An example of an ad hoc network such as this is a wireless network of "Wifi" type allowing fast setup of a network connection between two computers. An embodiment of the invention therefore finds an application in this type of network by allowing terminals to relay the information originating from source terminals to destination terminals.

Figure 7:
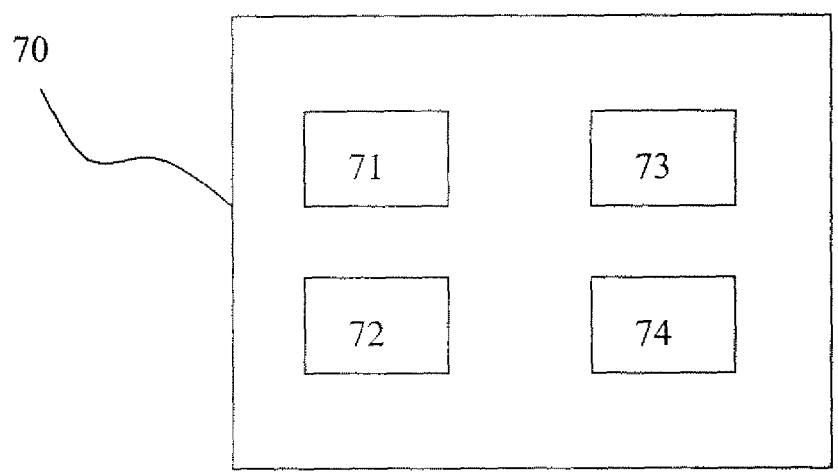
FIG. 7 illustrates a transmission device according to a particular embodiment of the invention.

4. Architecture of a Transmission Device According to an Embodiment of the Invention A simplified architecture of a device for implementing the communication method according to an embodiment of the invention is presented in relation to FIG. 7.

Such a communication device 70 comprises means 71 for determining a temporal variation of an impulse response of a transmission channel established between a first entity and a second entity of a cell. The device 70 also comprises means 72 for determining a temporal variation of an impulse response of at least one global transmission channel established between the source entity and the destination entity and passing through at least one relay entity, on the basis of the temporal variations of the impulse responses of said transmission channels.

The device 70 further comprises means 73 for selecting a global transmission channel as a function of the temporal variations of the impulse responses of the global transmission channels, as well as means 74 for informing the relay entity $M_k$ through which the selected global channel passes to relay exchanges of data between the source entity $M_i$ and the destination entity $M_j$.

Finally, the subject of an embodiment of the invention is also a computer program, in particular a computer program on or in an information medium or memory, suitable for implementing an embodiment of the invention. This program can use any programming language, and be in the form of source code, object code, or of code intermediate between source code and object code such as in a partially compiled form, or in any other desirable form for implementing a method according to an embodiment of the invention.

The information medium can be any entity or device capable of storing the program. For example, the medium can be non-transient and comprise a storage means, such as a ROM, for example a CD ROM or a ROM of a microelectronic circuit, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to an embodiment of the invention can in particular be downloaded from a network of Internet type.

Although the present disclosure has been described with reference to one or more examples, workers skilled in the art will recognize that changes may be made in form and detail without departing from the scope of the disclosure and/or the appended claims.

The invention claimed is:

1. A method of communication between at least one source entity and one destination entity, in a cooperative network comprising a plurality of entities, the method comprising:
    a step of determining, for a source entity of said network, a temporal variation of an impulse response of a transmission channel established between said source entity and a destination entity of said network, comprising calculating a temporal correlation function of this transmission channel;
    a step of determining a temporal variation of an impulse response of at least one of a plurality of global transmission channels established between the source entity and the destination entity and passing through at least one mobile relay entity, based on temporal variations of impulse responses of transmission channels established between the source entity and the relay entity and between the relay entity and the destination entity, comprising calculating a temporal correlation function of each of both the transmission channels established between the source entity and the relay entity and between the relay entity and the destination entity; and
    a step of selecting a global transmission channel from among different global transmission channels of the plurality of global transmission channels.

2. The communication method as claimed in claim 1, wherein a global transmission channel is selected when the temporal variation of the impulse response of said global transmission channel is above a predetermined threshold and when a temporal variation of an impulse response of a transmission channel established directly between the source entity and the destination entity is below said predetermined threshold.

3. The communication method as claimed in claim 1, wherein said selection step takes account of at least one additional criterion belonging to the group comprising:
    an attenuation of a signal in said transmission channel;
    a speed of travel of said relay entity;
    a distance between said source entity and said relay entity;
    a distance between said relay entity and said destination entity;
    a quantity of passband available;
    an operating state of said relay entity;
    interference (between various paths, between users, between cells).

4. The communication method as claimed in claim 1, wherein the method comprises a step of informing the relay entity $M_k$ through which the selected global channel passes to relay exchanges of data between the source entity $M_i$ and the destination entity $M_j$.

5. A device for managing a communication between at least one source entity and one destination entity, in a cooperative network comprising a plurality of entities, the device comprising:
    means for determining, for a source entity of said network, a temporal variation of an impulse response of a transmission channel established between said source entity and a destination entity of said network, comprising calculating a temporal correlation function of this transmission channel,
    means for determining a temporal variation of an impulse response of at least one of a plurality of global transmission channels established between the source entity and the destination entity and passing through at least one mobile relay entity, based on temporal variations of the impulse responses of transmission channels established between the source entity and the relay entity and between the relay entity and the destination entity, comprising calculating a temporal correlation function of each of both the transmission channels established between the source entity and the relay entity and between the relay entity and the destination entity; and means for selecting a global transmission channel from among different global transmission channels of the plurality of global transmission channels.

6. The communication device as claimed in claim 5, wherein the device also comprises means for informing the relay entity through which the selected global channel passes to relay exchanges of data between the source entity and the destination entity.

7. A computer program product stored on a non-transitory medium readable by computer and/or executable by a microprocessor, wherein the program product comprises program code instructions for execution of a method of communication between at least one source entity and one destination entity, in a cooperative network comprising a plurality of entities, when executed on a computer, the method comprising:

a step of determining, for a source entity of said network, a temporal variation of an impulse response of a transmission channel established between said source entity and a destination entity of said network, comprising calculating a temporal correlation function of this transmission channel;

a step of determining a temporal variation of an impulse response of at least one of a plurality of global transmission channels established between the source entity and the destination entity and passing through at least one mobile relay entity, based on temporal variations of the impulse responses of transmission channels established between the source entity and the relay entity and between the relay entity and the destination entity, comprising calculating a temporal correlation function of each of both the transmission channels established between the source entity and the relay entity and between the relay entity and the destination entity; and a step of selecting a global transmission channel from among different global transmission channels of the plurality of global transmission channels.

\* \* \* \* \*